US008484756B2

(12) United States Patent
Bertness et al.

(10) Patent No.: US 8,484,756 B2
(45) Date of Patent: Jul. 9, 2013

(54) TIP-MOUNTED NANOWIRE LIGHT SOURCE INSTRUMENTATION

(75) Inventors: Kristine A. Bertness, Boulder, CO (US); Norman A. Sanford, Boulder, CO (US); Pavel Kabos, Fort Collins, CO (US); Thomas M. Wallis, Lafayette, CO (US)

(73) Assignee: The United States of America, as represented by the Secretary of Commerce, the National Institute of Standards and Technology, Washington, DC (US)

( * ) Notice: Subject to any disclaimer, the term of this patent is extended or adjusted under 35 U.S.C. 154(b) by 0 days.

(21) Appl. No.: 13/009,300

(22) Filed: Jan. 19, 2011

(65) Prior Publication Data

US 2012/0185977 A1    Jul. 19, 2012

(51) Int. Cl.
*G01Q 60/18* (2010.01)
*G01Q 60/22* (2010.01)

(52) U.S. Cl.
USPC .................. 850/32; 850/30; 73/105

(58) Field of Classification Search
USPC .................... 850/6, 8, 9, 21, 30–33
See application file for complete search history.

(56) References Cited

U.S. PATENT DOCUMENTS

| 6,633,711 | B1 * | 10/2003 | Pilevar et al. ................. 385/123 |
| 7,462,270 | B2 | 12/2008 | Naughton |
| 7,612,424 | B1 | 11/2009 | Espinosa et al. |
| 2005/0210966 | A1 * | 9/2005 | Watanabe et al. ............... 73/105 |
| 2008/0054168 | A1 * | 3/2008 | Hoshino et al. ............... 250/216 |
| 2008/0061231 | A1 | 3/2008 | Chamberlin et al. |
| 2008/0224922 | A1 * | 9/2008 | Cleland et al. ................ 342/175 |
| 2009/0308844 | A1 | 12/2009 | Cohen et al. |
| 2010/0006817 | A1 * | 1/2010 | Ohlsson et al. ................. 257/13 |
| 2011/0163292 | A1 * | 7/2011 | Wang et al. ..................... 257/13 |

FOREIGN PATENT DOCUMENTS

WO    03/087709    10/2003

OTHER PUBLICATIONS

Hovsepyan, et. al. "Direct Imaging of Photoconductivity of Solar Cells by Using a Near-Field Scanning Microwave Microprobe", Journal of Applied Physics, 106, 114901, (2009).*
Hovsepyan, et. al. "Direct Imaging of Photoconductivity of Solar Cells by Using a Near-Field Scanning Microwave Microprobe", Journal of Applied Physics, 106, 114901, (2009).*
Article: "Application of Microwave Scanning Probes to Photovoltaic Materials," Bertness, et al., Jun. 2010.
Article: "Controlled Nucleation of GaN Nanowires Grown with Molecular Beam Epitaxy," Bertness et al., Advanced Functional Materials 2010, XX, 1-5 Copyright Wiley-VCH Verlag GmbH & Co. KGaA, Weinheim.
Article: "Efficient Photo-Enhancement of GaP and AlGaP Growth in Chemical Beam Epitaxy," Yoshimoto, et al., J. Appl. Phys. 70 (10), Nov. 15, 1991, Copyright 1991 American Institute of Physics, pp. 5708-5709.
Article: "Mechanism of GaAs Selective Growth in Ar+ Laser-Assisted Metalorganic Molecular Beam Epitaxy," Sugiura, et al., Japanese Journal of Applice Physica, vol. 29, No. 1, Jan. 1990, pp. L1-L3.

(Continued)

*Primary Examiner* — Robert Kim
*Assistant Examiner* — David E Smith
(74) *Attorney, Agent, or Firm* — Carlson, Gaskey & Olds, P.C.

(57) ABSTRACT

A scanning probe microscopy instrument includes a cantilevered tip that has a nanowire light emitting diode (LED).

17 Claims, 1 Drawing Sheet

OTHER PUBLICATIONS

Article: "Polarization-Resolve Pholuminescence Study of Individual GaN Nanowires Grown by Catalyst-Free Molecular Beam Epitaxy," Schlager, et al., Applied Physics Letters 88, 213106 (2006).

Article: "Core-Multishell Nanowire Heterostructures as Multicolor, High-Efficiency Light-Emitting Diodes," Qian, et al., Nano Letters 2005 vol. 5, No. 11 2287-2291.

Article: "Temperature-Dependent Ultraviolet Absorption Spectra of Group0 IIIb and Vb Compounds Used in Photo-Assisted Chemical Vapor Deposition," Okabe, et al, J. Appl. Phys. 69(3), Feb. 1, 1991.

Article: "Importance of Multiple-Phonon Interactions in Molecular Dissociation and Naofabrication Using Optical Near Fields," Kobayahsi, et al., IEEE Transactions on Nanotechnology, vol, 4, No. 5, Sep. 2005.

Article: "High-Brightness Light Emitting Diodes Using Dislocation-Free Indium Gallium Nitride/Gallium Nitride Multiquantum-Well Nanorod Arrays," Kim, et al., Nano Letters 2004 vol. 4, No. 6, 1059-1062.

Article: "Fabrication of a Nanometric Zn Dot by Nonresonant Near-Field Optical Chemical-Vapor Deposition," Kawazoe, Applied Physics Letters, vol. 79, No. 8, Aug. 20, 2001.

Article: "Near-Field Microwave Microscope Measurements to Characterize Bulk Material Properties," Imtiaz, et al., Applied Physics Letters 90, 243105 (2007).

Article: "Direct Imaging of Photoconductivity of Solar Cells by Using a Near-Field Scanning Microwave Microprobe," Hovsepyan, et al., Journal of Applied Physics 106, 114901 (2009).

Article: "Nucelation Conditions for Catalyst-Free GAN Nanowires," Bertness, et al., Journal of Crystal Growth, 300 (2007), 94-99.

Article: "Spontaneously Grown GaN and AlGaN Nanowires," Bertness, et al., Journal of Crystal Growth, 287 (2006), 522-527.

Article: "Catalyst-Free Growth of GaN Nanowires," Bertness, et al., Journal of Electronic Materials, vol. 35, No. 4, 2006.

Article: "Formation of AlN and GaN Nanocolumns on Si(111) Using Molecular Beam Epitaxy with Ammonia as a Nitrogen Source," Bertness, et al., Phys. Stat. Sol. (c)2, No. 7, 2369-2372 (2005).

Article: "High Degree of Crystalline Perfection in Spontaneously Grown GaN Nanowires," Bertness, et al., Mater. Res. Soc. Symp. Proc. vol. 896, Copyright 2006 Materials Research Society.

Article: "Gallium Arsenide Probes for Scanning Near-Field Probe Microscopy," Heisig, et al., Applied Physics A Materials Science & Processing, Spring-Verlag 1998.

\* cited by examiner

TIP-MOUNTED NANOWIRE LIGHT SOURCE INSTRUMENTATION

BACKGROUND

This disclosure relates to scanning probe microscopy instruments. A scanning probe microscopy instrument, such as an atomic force microscope ("AFM"), typically includes a cantilevered probe tip that extends from the instrument. The AFM positions the tip in proximity of a sample under test in order to detect a characteristic of the sample. The tip scans the surface of sample under test, and the AFM generates an image of the surface based upon interactions between the tip and the surface as a function of tip position on the sample. The tip is normally made of platinum, silicon nitride, or gold and is formed into a precise point to facilitate the interaction with the sample.

SUMMARY

An exemplary scanning probe microscopy instrument includes a cantilevered tip that has a nanowire light emitting diode (LED).

In another aspect, a scanning probe microscopy instrument includes a cantilevered tip, a pair of electrodes on the cantilevered tip, and a gallium nitride nanowire electrically connected to the pair of electrodes.

An example method for use with a scanning probe microscopy instrument includes activating a nanowire light emitting diode that is on a cantilevered tip to emit light, and detecting a characteristic of a sample under test in response to the light.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
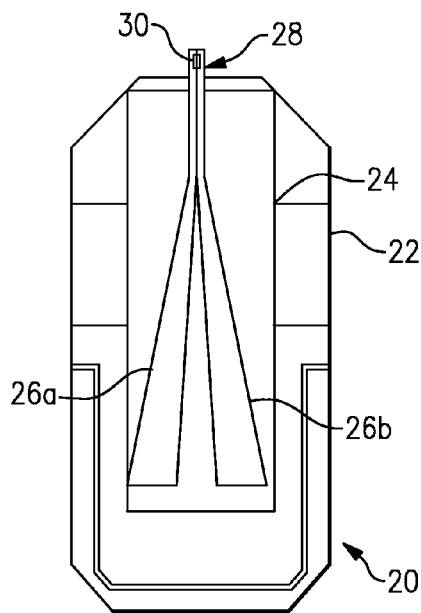
FIG. 1 illustrates an example scanning probe microscopy instrument.

FIG. 1 illustrates selected portions of an example scanning probe microscopy instrument 20. In the illustrated example, the instrument 20 is an atomic force microscopy ("AFM") instrument. However, it is to be understood that the AFM only serves as an example. This disclosure is not limited to any particular kind of scanning probe device and other scanning probe devices and arrangements would benefit from the examples herein.

The instrument 20 includes an instrument base 22 and a substrate 24 that is disposed upon the instrument base 22. In this example, the substrate 24 is an insulating material and the instrument base 22 is a suitable substrate material, such as silicon. A pair of electrodes 26a, 26b is arranged on the substrate 24 and are electrically connected to a suitable electronic circuit or controlling circuit for providing electric current. The substrate 24 includes a cantilevered tip 28 that extends outward from a main part of the substrate 24. The cantilevered tip 28 includes a nanowire light-emitting diode (LED) 30 disposed thereon. In general, the nanowire LED 30 extends orthogonally from the plane of the cantilevered tip 30 in the example shown. The term "nanowire" refers to a wire of generally constant cross-sectional area that has a nanoscale maximum cross-sectional dimension (e.g., diameter) taken along a plane that is perpendicular to the long axis of the wire. For example, the maximum cross-sectional dimension is no greater than 750 nanometers, and in a further example is no greater than 500 nanometers. The length of the nanowire LED 30 is not limited.

Figure 2:
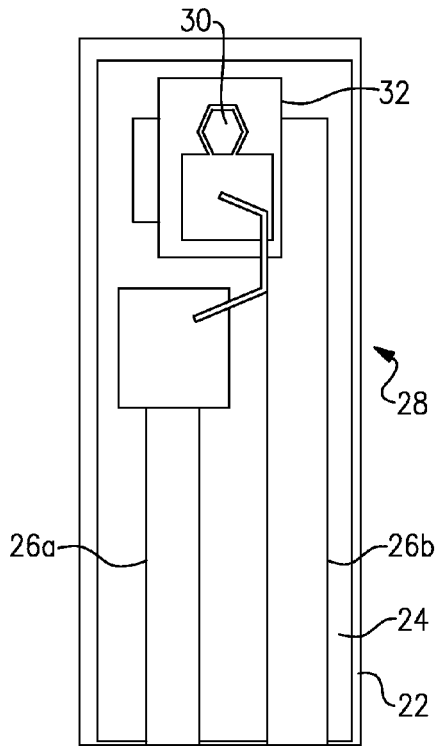
FIG. 2 illustrates an example cantilevered tip and nanowire light emitting diode of the scanning probe microscopy instrument of FIG. 1.
Figure 3:
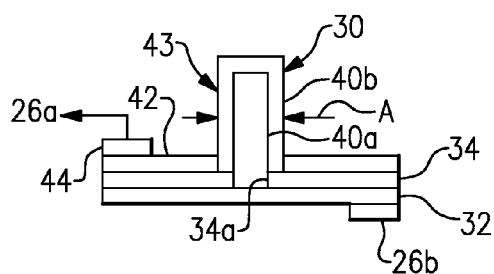
FIG. 3 illustrates an example electric circuit and nanowire light emitting diode.

Referring to FIG. 2 that shows the cantilevered tip 28 and FIG. 3 that shows the nanowire LED 30, the electrodes 26a and 26b extend toward a free, distal end of the cantilevered tip 28. The electrodes 26a and 26b may be formed from suitable materials for controlling or activating the nanowire LED 30. For instance, the electrode 26a may be formed from a metal suitable for contacting p-type semiconductor material and the electrode 26b may be formed from a metal suitable for contacting n-type semiconductor material.

In the illustrated example, the nanowire LED 30 is mounted on the electrode 26b. Alternatively, the nanowire LED 30 could be mounted on the other electrode 26a or on another part of the cantilevered tip 28. The cantilevered tip 28 includes a conductive substrate 32 that is electrically connected with the electrode 26b. For instance, the conductive substrate 32 may be silicon or other type of conducting material. An insulating layer 34 is located on the conductive substrate 32 and includes an orifice 34a therethrough. That is, the insulating layer 34 includes a hole that extends completely through the thickness of the insulating layer 34 such that the conductive substrate 32 is exposed through the hole.

The nanowire LED 30 in the illustrated example includes a core 40a and a shell 40b that extends around the core 40a. The core 40a and the shell 40b extend generally from a base at an insulating layer 42 to a free end, or tip. The nanowire LED 30 includes a portion 43 along which the nanowire LED 30 has a constant cross-sectional area (represented at A, FIG. 3).

The core 40a extends through the orifice 34a of the insulating layer 34 such that the core 40a is in electrical connection with the conductive substrate 32. The shell 40b generally surrounds the portion of the core 40a that extends above the insulating layer 34. Another conductive layer 42, such as a metal layer, is disposed on the insulating layer 34 and is electrically connected with the shell 40b. The conductive layer 42 is electrically connected to the other electrode 26a through a wire bond 44. Thus, the cantilevered tip 30 includes an electronic circuit through the electrode 26b, the conductive substrate 32, the core 40a, the shell 40b, the conductive layer 42, the wire bond 44 and the other electrode 26a.

In general, the nanowire LED 30 is made of at least one semiconducting material. For instance, the nanowire LED 30 includes a material based on gallium nitride. In a further example, the nanowire LED 30 includes a p-type semiconductor material and n-type semiconductor material. For instance, the core 40a may be the n-type semiconductor material and the shell 40b may be the p-type semiconductor material, or vice versa. In a further example, the semiconductor materials may include aluminum-gallium nitride and indium-gallium nitride. Upon activating the electronic circuit, the semiconducting materials excite and emit light, such as laser light or incoherent light.

In operation, the scanning probe microscopy instrument 20 provides a light source by way of the nanowire LED 30 to achieve a unique functionality for nanostructure growth, etching, and characterization, for example. For instance, the nanowire LED 30 may be used for photo-enhanced chemistry with nanometer-scale spatial control. As an example, some chemical reactions proceed with the addition of ultraviolet and/or visible light. Therefore, the use of the nanoscale LED 30 can be used to spatially control such reactions and further allow the use of near-field optical field for photochemical processes because the gap between the cantilevered tip 28 and the surface under test can reliably be maintained to be comparable to the near field region of about 40×60×60 nanometers from the tip. One application is the process of tip-enhanced growth of nanostructures, with placement accuracy determined by the control circuitry used for manipulating the cantilevered tip 28. The nanostructure could be, for example, a semiconductor material, metal material, insulator, or other type of material, depending upon the reactant molecules that interact with the light emitted from the nanowire LED 30. Different classes of molecules could alternatively be used to produce localized etching of the substrate and cleaning of the cantilevered tip 28. In further examples, the particular wavelength range of the light emitted from the nanowire LED 30 can be used to achieve certain reactions. As an example, the wavelength range of the nanowire LED 30 may be designed to be between 280 and 450 nanometers, depending upon the materials selected for the nanowire LED 30.

The nanowire LED 30 may also serve the function of the active force tip for atomic force microscopy feedback. Although the nanowire LED 30 could be placed on any conventional scanning probe microscopy tip, the nanowire LED 30 that is made from gallium nitride is mechanically strong and dimensionally similar to known AFM tips and therefore could be used for such a purpose. In addition or alternative to such a use, the application of gallium nitride nanowire LEDs 30 could also serve other structural functions within a scanning probe microscopy instrument in addition to providing a light emitting source.

Figure 4:
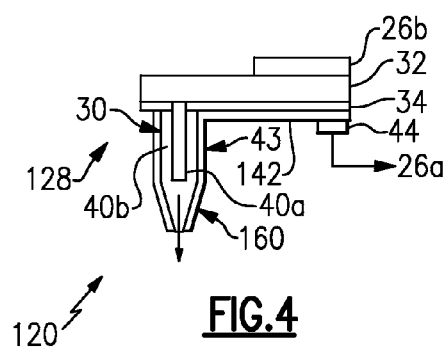
FIG. 4 illustrates an example scanning probe microscopy instrument having a nanowire light emitting diode and radio frequency functionality.

FIG. 4 illustrates a modified embodiment of a scanning probe microscopy instrument 120. In this disclosure, like reference numerals designate like elements where appropriate and reference numerals with the addition of one-hundred or multiples thereof designate modified elements that are understood to incorporate the same features and benefits of the corresponding original elements. In this example, the conductive layer 42 is replaced with the conductive layer 142 that also forms a metal jacket 160 around the nanowire LED 30.

In operation, the metal jacket 160 and conductive layer 142 serve as an RF or DC lead, which enables the scanning probe microscopy instrument 120 to be used for near field scanning microwave microscopy. For instance, the metal jacket 160 forms a section of a resonant microwave cavity and the losses due to interaction with the sample under test can be related to changes in carrier density in the immediate vicinity of the tip. Because the nanowire can both excite carriers locally with light and then detect concentration and time-dependent decay, this mode of operation offers dual information on optoelectronic materials, including photovoltaics. In the example shown, the tip of the nanowire LED 30 and metal jacket 160 tapers to allow improved spatial resolution.

In addition to or as an alternative to the illustrated examples, the nanowire LED 30 could also be combined with other types of detectors to enable other types of material characterizations. For instance, the nanowire LED could be useful in measuring photoluminescence and photoconductivity of nanostructures, characterizing absolute intensity and spatial distribution of nanoscale light sources such as nanowire lasers, characterizing quantum efficiency of nanostructures used in photovoltaics or light emitting diodes, or fine spatial characterization of conventional materials. Additionally, the RF-enhanced device, as shown in FIG. 4, allows simultaneous measurement of carrier concentration, optical emission, and DC conductivity on nanometer length scales, which existing instrumentation can only measure one of these properties at a time making correlation of the different properties difficult for materials with grain boundaries or sharp interfaces and small features.

Additionally, the disclosed scanning probe microscopy instruments 20, 120 allow etching and growth with a single instrument because the instrument can be used with a gas or vapor handling system that can switch reactants in the vicinity of the nanowire LED 30 such that the mode switches between etching mode and growth mode without removal of the specimen to another chamber. The mode can also be controlled to be lateral or vertical growth modes by control of the cantilevered tip 28, which can either be pulled away from the surface to generate vertical growth or moved laterally with regard to the surface to promote lateral growth.

Additionally, the nanowire LED 30 is relatively strong and chemically resistant with regard to the etching of other materials, such as silicon and glass fiber, which allows the nanowire LED 30 to be used as a source for photochemistry with greater process flexibility and operating range for near field scanning optical microscopy.

Additionally, the nanowire LED may allow lower substrate temperatures for semiconductor growth because the use of photo enhancement reduces the temperatures needed to grow semiconductor materials of the desired quality by potentially of hundreds degrees and directly on CMOS chips, which would facilitate reduction of degradation of the existing devices on the chip because of the lower temperatures.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A scanning probe microscopy instrument comprising:
a cantilevered tip that includes a nanowire light-emitting diode (LED), the nanowire LED has a core and a shell that is located around the core, and the core is an n-type semiconductor material and the shell is a p-type semiconductor material, and
a metal jacket around the nanowire LED, the metal jacket defining a resonant cavity such that the metal jacket is operable as a radio frequency lead.

2. The scanning probe microscopy instrument as recited in claim 1, wherein the nanowire LED comprises gallium nitride.

3. The scanning probe microscopy instrument as recited in claim 1, wherein the p-type semiconductor material is p-gallium nitride and the n-type semiconductor material is n-gallium nitride.

4. The scanning probe microscopy instrument as recited in claim 1, wherein the metal jacket and the nanowire LED include a tapered tip.

5. The scanning probe microscopy instrument as recited in claim 1, wherein the nanowire LED comprises a base, a free end and a portion between the base and the free end along which the nanowire LED has a constant cross-sectional area.

6. A scanning probe microscopy instrument comprising:
a substrate having a cantilevered tip;
a pair of electrodes on the cantilevered tip; and
a gallium nitride nanowire extending orthogonally from the cantilevered tip and electrically connected to the pair of electrodes.

7. The scanning probe microscopy instrument as recited in claim 6, wherein the gallium nitride nanowire comprises a p-type semiconductor material and an n-type semiconductor material.

8. The scanning probe microscopy instrument as recited in claim 7, wherein the gallium nitride nanowire includes a core of the n-type semiconductor material and a shell of the p-type semiconductor material that is located around the core.

9. The scanning probe microscopy instrument as recited in claim 6, further comprising a metal jacket around the gallium nitride nanowire, wherein the metal jacket and the gallium nitride nanowire include a tapered tip.

10. A method for use with a scanning probe microscopy instrument, the method comprising:
providing a scanning probe including a substrate having a cantilevered tip, a pair of electrodes on the cantilevered tip, a nanowire light-emitting diode (LED) extending orthogonally from the cantilevered tip and electrically connected to the pair of electrodes and a metal jacket around the gallium nitride nanowire, the metal jacket defining a resonance cavity such that the metal jacket is operable as a radio frequency lead;
activating the nanowire LED to emit light; and
detecting a characteristic of a sample under test, and the characteristic is a response of the sample under test to the light.

11. The method as recited in claim 10, wherein the characteristic is photoluminescence.

12. The method as recited in claim 10, wherein the characteristic is photovoltaic.

13. The method as recited in claim 10, wherein the characteristic is photochemical.

14. The scanning probe microscopy instrument as recited in claim 1, wherein the cantilevered tip includes a conductive substrate that is electrically connected to one of a pair of electrodes on the cantilevered tip, an insulating layer on the conductive substrate, the insulating layer defining an orifice that extends therethrough to the underlying substrate, and a conductive layer on the insulating layer that is electrically connected to the other of the pair of electrodes, wherein the nanowire LED has a core and a shell that is located around the core, the core extending from the substrate through the orifice of the insulating layer with the shell being in electrical contact with the conductive layer such that there is an electronic circuit through the one of the pair of electrodes, the conductive substrate, the core, the shell, the conductive layer and the other of the pair of electrodes.

15. The scanning probe microscopy instrument as recited in claim 1, wherein the nanowire LED comprises a base, a free end and a portion between the base and the free end along which the nanowire LED has a constant cross-sectional area, and further including a metal jacket around the nanowire LED, the metal jacket and the nanowire LED including a tapered tip.

16. The scanning probe microscopy instrument as recited in claim 6, wherein the cantilevered tip includes a conductive substrate that is electrically connected to one of the pair of electrodes on the cantilevered tip, an insulating layer on the conductive substrate, the insulating layer defining an orifice that extends therethrough to the underlying substrate, and a conductive layer on the insulating layer, the conductive layer being electrically connected to the other of the pair of electrodes and extending around the gallium nitride nanowire, wherein the gallium nitride nanowire has a core and a shell that is located around the core, the core extending from the substrate through the orifice of the insulating layer with the shell being in electrical contact with the conductive layer such that there is an electronic circuit through the one of the pair of electrodes, the conductive substrate, the core, the shell, the conductive layer and the other of the pair of electrodes, and wherein the conductive layer and the gallium nitride nanowire include a tapered tip.

17. The method as recited in claim 10, wherein the cantilevered tip includes a conductive substrate that is electrically connected to one of the pair of electrodes on the cantilevered tip, an insulating layer on the conductive substrate, the insulating layer defining an orifice that extends therethrough to the underlying substrate, and a conductive layer on the insulating layer, the conductive layer being electrically connected to the other of the pair of electrodes, wherein the nanowire LED has a core and a shell that is located around the core, the core extending from the substrate through the orifice of the insulating layer with the shell being in electrical contact with the conductive layer, and wherein the activating includes activating an electronic circuit through the one of the pair of electrodes, the conductive substrate, the core, the shell, the conductive layer and the other of the pair of electrodes.

* * * * *